(No Model.)

F. T. PINTER.
CHURN DASHER.

No. 256,367.  Patented Apr. 11, 1882.

UNITED STATES PATENT OFFICE.

FRANCIS T. PINTER, OF SCHULENBURG, TEXAS.

CHURN-DASHER.

SPECIFICATION forming part of Letters Patent No. 256,367, dated April 11, 1882.

Application filed December 24, 1881. (No model.)

*To all whom it may concern:*

Be it known that I, FRANCIS T. PINTER, of Schulenburg, in the county of Fayette and State of Texas, have invented certain new and useful Improvements in Churn-Dashers; and I do hereby declare the following to be a full, clear, and exact description of the invention, such as will enable others skilled in the art to which it pertains to make and use it, reference being had to the accompanying drawings, which form part of this specification.

My invention relates to an improvement in churn-dashers; and it consists in attaching to opposite sides of a revolving churn-dasher weighted arms for the purpose of balancing the upper part of the dasher, so as to cause it to revolve with greater force and to balance it more easily upon its pivot.

Figure 1:
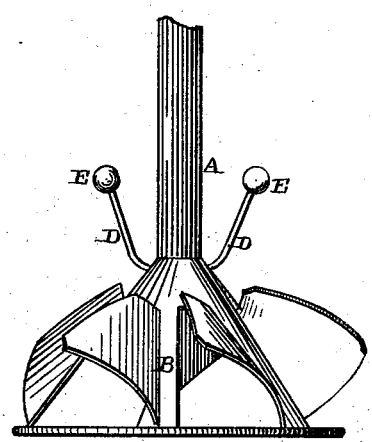
Figure 2:
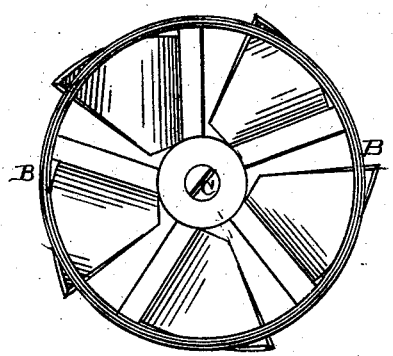

Figure 1 is a side elevation of my invention complete. Fig. 2 is an inverted view of the same.

A represents a dasher-rod, and B the revolving dasher, which is secured to the lower end of the rod by means of the pivotal bolt C. This dasher, constructed as shown, is intended to revolve rapidly through the cream as it is raised and lowered in the usual manner. Secured to the opposite sides of the upper portion of this dasher are the arms D, which have the balls E secured to their outer ends for the purpose of acting as a counter-balance to the upper part of the dasher, and to cause the dasher to revolve with greater force and more evenness than it will do where weights are not used, as is here shown. By counterbalancing the upper part of the dasher it is made to revolve much more evenly upon its pivot, and hence does not wear unevenly at different points, so that after it has been used a short time the dasher becomes so worn that it becomes practically worthless.

I am aware that a revolving dasher secured to the lower end of a dasher-rod is not new, and this I do not broadly claim.

I am aware that it is not new to use a fly-wheel for the purpose of causing a continuous rotary motion of the dasher, and this I disclaim. My invention differs from this in applying weighted arms to a dasher which has both a vertical and a rotary movement.

Having thus described my invention, I claim—

1. In a churn-dasher, the combination of the rod A, the dasher B, pivoted upon the lower end of the rod and having both a vertical and a rotary movement, and the weighted arms D, which are applied to opposite sides of the dasher, substantially as shown.

2. A churn-dasher having both a vertical and a rotary motion, and having weighted arms applied directly to it, substantially as set forth.

In testimony whereof I affix my signature in presence of two witnesses.

FRANCIS T. PINTER.

Witnesses:
HUGO CHOTEK,
HENRY BERGERTT.